United States Patent Office 3,684,644
Patented Aug. 15, 1972

---

3,684,644
SELF-FUSING TAPE HAVING PRESSURE-SENSITIVE ADHESIVE PROPERTIES
Robert B. Snell, White Bear Lake, Minn., assignor to Minnesota Mining and Manufacturing Company, St. Paul, Minn.
No Drawing. Continuation-in-part of abandoned application Ser. No. 776,796, Nov. 18, 1968. This application Feb. 22, 1971, Ser. No. 117,721
Int. Cl. C09j 3/12, 7/02
U.S. Cl. 161—165                              6 Claims

---

ABSTRACT OF THE DISCLOSURE

Self-fusing tapes that form an insulating sheath having high resistance to penetration by moisture and that have excellent self-fusing properties and immediate adhesion to conductor and insulation surfaces; the tape comprises a self-fusing base sheet based on elastomers and resinous tackifiers and a layer of rubber-resin pressure-sensitive adhesive coated on the base sheet.

---

REFERENCE TO RELATED APPLICATION

This application is a continuation-in-part of a copending application, Ser. No. 776,796, filed Nov. 18, 1968, and now abandoned.

BACKGROUND OF THE INVENTION

Self-fusing, electrically insulating tapes are formed from stretchable, elastic, high-dielectric-strength compositions that are generally based on a combination of unvulcanized or partially vulcanized elastomers and resinous tackifiers. When stretched and wrapped tightly around a workpiece such as a splice of electrical conductors, these elastomer- and tackifier-based, self-fusing tapes form an insulating sheath in which it is difficult after a time to distinguish overlapping convolutions. This nearly homogeneous insulating sheath is desired for several reasons, but one major goal for such a sheath is that it exhibit resistance to penetration, such as the penetration by moisture that can occur between the convolutions of a sheath of tape that does not self-fuse.

While insulating sheaths provided by prior-art self-fusing tapes have exhibited rather good resistance to penetration by moisture, they are not wholly impervious. At least capillary passages remain in the insulating sheath provided by prior-art self-fusing tapes, and moisture does penetrate through these passages when the conductors wrapped with the tapes are used in severe moisture conditions, such as when a cable having an exposed insulating sheath formed from the tape is buried underground or when such a cable is laid in a conduit or placed in some other location that may temporarily fill with water. Enough moisture can penetrate and be absorbed in such a sheath, especially a sheath formed from a tape that is low in elastic force of recovery, that in some cases the sheath fails as insulation, causing significant current losses, shorts between conductors or to an electrical ground, radio frequency interference, and other problems.

SUMMARY OF THE INVENTION

The present invention provides a self-fusing tape from which insulating sheaths that have excellent resistance against moisture-penetration may be formed. (A useful test for measuring self-fusing properties is the test of Military Specification MIL–I–3825B, which is described later in this specification; when "self-fusing tape" or "self-fusing base sheet" are used in the claims, it is meant that the tape or base sheet passes the described MIL–I–3825B test.) Briefly, tape of the invention generally comprises and elastomer- and tackifier-based self-fusing base sheet and, firmly united to at least one surface of this self-fusing base sheet, a layer at least about ¼ mil in thickness of a rubber-resin pressure-sensitive adhesive. While such a pressure-sensitive adhesive may ordinarily absorb more moisture than the self-fusing base sheet absorbs itself, when coated on a self-fusing base sheet in a tape of this invention, it surprisingly reduces the mount of moisture that penetrates and is absorbed in a sheath formed from the tape. Apparently, the pressure-sensitive adhesive at least partially fills the capillary passages that existed in the sheath formed by previous self-fusing tapes and by filling the passages greatly reduces the amount of moisture that passes through those passages.

An additional unexpected aspect of the use of rubber-resin pressure-sensitive adhesives on self-fusing base sheets is that the adhesive does not prevent overlapping convolutions of the tape from self-fusing, as might be expected, but in many cases improves those self-fusing characteristics. For example, some tapes of the invention fuse in one of the self-fusing test of Military Specification MIL–I–3825B in a shorter time after application to the test workpiece than the base sheet fuses, and some tapes have quite good self-fusing properties even though the base sheet by itself barely, if at all, passes the self-fusing test. The improvement in self-fusing properties is especially advantageous when the tape is to be applied during cold weather, when prior-art self-fusing tapes often have only marginal self-fusing properties.

Another advantage of a tape of this invention is that it has immediate adhesion to the bare, metal surface of a conductor on which it it is to be used as insulation, as well as to the surface of the original insulation on the conductor and to itself. The result of this immediate adhesion is that application of the tape is easier, the newly insulated conductor or conductors may be put into service more quickly (the sheath of prior-art self-fusing tapes often developed a tight fit with the original insulation of the conductor due to the compressive effect of the contracting tape, but only after a lapse of some time), and a sheath of the new tape need not be wrapped with a plastic tape, which was often done in the past to hold the tape tightly, as well as to add moisture-resistance.

DESCRIPTION

As noted previously, the base sheet of a self-fusing tape of this invention generally comprises an elastomer—either natural or synthetic—together with a resinous tackifier. For the purposes of this specification, "elastomer" is used for its conventional meaning.[1] A preferred tape of this invention uses an ethylene-propylene elastomer, such as an EPM elastomer (ethylene-propylene copolymer) or an EPDM elastomer (ethylene, propylene, and a minor proportion of a diene with the residual unsaturated portion of the diene in the side chain). When at least 15, and preferably 25, parts of each 100 parts of elastomer in a base sheet of a tape of this invention are ethylene-propylene elastomer, the tape exhibits better resistance to such environmental and exposure conditions as ultraviolet light, high temperature, and atmospheres filled with oil-like solvents, and ozone. Another elastomer that is used in self-fusing base sheets of tapes of this invention, and which contributes good self-fusing properties to the base sheet, is an isobutylene elastomer such as butyl rubber or polyisobutylene. In preferred tapes of the invention, at least 25 parts of each 100 parts of elastomer in the base sheet, is an isobutylene elastomer. Other useful elastomers for inclusion in the base sheet are crude

---

[1] Which is defined and exemplified in Table 3–2 of Brace Golding, "Polymers and Resins" (Princeton, N.J., 1959), page 22.

natural rubber, styrene-butadiene elastomers, polyisoprenes, polyhexanes and silicone elastomers.

The resinous tackifier that is generally included in the self-fusing base sheet of a tape of this invention may be selected from a wide variety of tackifiers, including glyceryl esters of hydrogenated rosin; thermoplastic terpene resins; petroleum hydrocarbon resins; resins derived from pine wood and containing phenol, aldehyde, and ether groups; coumarone-indene resins; synthetic phenolic resins; and low-molecular-weight polybutenes. In addition to tackifying an elastomer with such tackifiers, some elastomers may be at least partially self-tackified, as when low-molecular-weight fractions tackify the high-molecular-weight fractions of the elastomer. In the preferred tapes of the invention, between 5 and 75 parts of resinous tackifiers are included for each 100 parts of elastomer in the base sheet.

The base sheet may be given added tensile strength, body, and handleability, by inclusion in the base sheet of a reinforcing thermoplastic resin. Base sheets of the invention should have a tensile strength of 125–150 pounds per square inch or more. In the preferred tapes of this invention, which have good self-fusing properties, between 10 and 50 parts of either polyethylene or polypropylene is included in the base sheet. In other tapes of the invention, which have poorer self-fusing properties but better tensile strength, elastomers in the base sheet are partially vulcanized. For example, between 1 and 15 parts of a curing agent, such as dicumyl peroxide (Di Cup), a nitrosoamine (such as Elastopar), a substituted phneolic resin that has reactive methylol groups such as (Bakelite CKR 1634), or sulfur, may be included with an ethylene-propylene, isobutylene, or other elastomer to partially vulcanize those elastomers. As a result of their better tensile strength, the partially vulcanized tapes are often less susceptible to moisture-permeability.

Plasticizers and softeners in an amount of between 10 and 50 parts per 100 parts of elastomer are preferably included in the base sheet composition to improve the flow and stretch characteristics of the composition as well as to ease processing of it. In addition, fillers such as soft clay, diatomaceous silica, and inorganic oxide may be included, and for reasons of economy such fillers usually are included, up to about 125 parts per 100 parts of elastomers. In addition, conductive particles such as acetylene carbon black particles may be added to produce semi-insulative tapes useful in providing an insulation sheath in which the voltage gradient is spread across the whole thickness of the sheath. Minor amounts (up to about 20 parts per 100 parts of elastomers) of various other additives may also be included in the composition of the base sheet of a tape of the invention to enhance particular properties or add certain characteristics.

In general, the self-fusing property that characterizes the base sheets of self-fusing tapes of this invention can be measured by the previously mentioned test specified in Military Specification MIL-I-3825B. In that test a piece of the base sheet to be tested is spirally wrapped, while elongated to 300±10% of its original length, along an approximately six-inch length of AWG size 8 wire in such a manner that, except at the ends, the tape is four layers deep. The specimen so formed is rolled between the palms of the hands, with clean rubber gloves being worn to avoid depositing corrosive acids and salts on the tape. The specimen is then conditioned at a temperature of 20°–30° C. (68–86° F.) for a period of 24 hours, after which it is subjected to a picking action in an attempt to unwrap the sheath. Base sheets having the necessary self-fusing properties for inclusion in preferred tapes of this invention generally cannot be unwound or delaminated in this test without causing rupture of the tape. Some less preferred tapes of the invention incorporate a base sheet that exhibits creep and flow so that overlapping convolutions eventually fuse but not within the 24 hours required to pass the MIL-I-3825B test. With a layer of pressure-sensitive adhesive applied to this base sheet as taught by this invention, however, the final tape does pass the test.

The pressure-sensitive adhesive that is applied in a layer to at least one surface of a base sheet in a tape of this invention may be selected from a variety of rubber-resin adhesives. These rubber-resin adhesives include a base elastomer—either natural or synthetic—such as crude natural rubber, styrene-butadiene elastomers, polybutadienes, polyisobutylenes, and the like. A resinous tackifier, which may be one of those used as the resinous tackifier in the base sheet, is mixed in the base elastomer generally in a proportion of about 40 or 50 parts to 150 parts per 100 parts of base elastomer.

In contrast to the base sheet, which is generally low in tack, the pressure-sensitive adhesive is highly tacky at room temperature. When coated on a backing, this adhesive firmly adheres the backing to a variety of dissimilar surfaces upon mere contact without the need of more than finger or hand pressure. The adhesive is sufficiently cohesive and elastic so that, despite its aggressive tackiness, it can be handled by the fingers and removed from smooth surfaces without leaving a residue. If the adhesive is included in a thickness of less than about ¼ mil, the desired improvement in resistance to penetration by moisture and the desired improvement in self-fusing properties is not obtained. While the adhesive can be included in various thicknesses above ¼ mil, addition of more than about 20 mils of adhesive is impractical and makes the tape difficult to wind in a roll that will not telescope or ooze adhesive.

The invention is further illustrated in the following examples.

Examples 1A–1C

An elastomeric sheet was formed from the following ingredients:

| | Parts by wt. |
|---|---|
| Ethylene-propylene-diene terpolymer having a Mooney value of 70 (Nordel 1070) | 233 |
| Butyl rubber that includes about 1–1.4 mol percent isoprene (Enjay Butyl 165) | 233 |
| High-molecular weight polyethylene having a molecular weight of about 150,000 weight average, a nominal melt index (by ASTM D 1238–57 T) of 0.6 ($I_2$ at L 90° C.), and a density of 0.945 (HiFax 1400 E) | 108 |
| Carbon black | 36.6 |
| Diatomaceous earth (Celite 270) | 286 |
| Naphthenic rubber process oil (Sunthene Oil No. 2100) | 116 |
| Hard, brittle, solid, glyceryl ester of hydrogenated resin having a specific gravity of 1.08 and a melting point of 85° C. (Staybelite Ester No. 10) | 80 |
| Thermoplastic terpene resin (Piccolyte Resin No. S-85) | 36.6 |

The ethylene-propylene-diene terpolymer was placed on a 2-roll rubber mill and broken down, after which the butyl rubber was added and the two milled together into a mixture. The polyethylene was then added to the batch and, while steam at a temperature between 270° and 330° F. was applied, the batch was cut back and forth until smooth. The hydrogenated rosin ester, the terpene resin, the naphthenic rubber process oil, the carbon black, and the diatomaceous earth were next separately mixed together and then added to the rubber-thermoplastic combination. The combined mixtures were then cut back and forth for approximately 15 minutes under the application again of steam having a temperature between 270° and 330° F. The final mixture was fed through a four-roll, inverted "L" calender, with the top two rolls being heated to about 310° F., the center roll to about 305° F. and the lower roll to about 175° F.; the mixture was calendered onto a suitable release liner in three different thicknesses—

19.8 mils for an A sample, 30.4 mils for a B sample, and 32.5 mils for a C sample.

A rubber-resin adhesive was then prepared from the following ingredients:

| | Parts by wt. |
|---|---|
| Smoked sheets of crude natural rubber | 100 |
| Thermoplastic polyterpene resin that softens at 115° C. (Piccolyte S–115) | 35 |
| Heat-treated wood rosin having a melting point of 74° C. and an acid number of 151 (Tenex Rosin) | 20 |
| Thermoplastic polyterpene resin (Croturez C) | 23.30 |
| Oil-soluble heat-reactive para-substituted phenol-aldehyde tackifier resin (Bakelite CKR 14634) | 20 |
| Zinc resinate having a melting point of 164° C. and acid number of zero (Zirex Resin) | 5 |
| 2,5-ditert-amylhydroquinone antioxidant (Santovar A) | 0.6 |
| Zinc oxide | 19.4 |
| Titanium dioxide | 19.4 |
| Sumatra yellow pigment | 1.4 |
| Heptane | 402 |

These ingredients were mixed by conventional rubber-resin adhesive mixing techniques, in which the elastomer ingredients are first milled together on a rubber mill and then all the ingredients are mixed together in a mogul mixer. The rubber-resin adhesive was then knife-coated on the elastomeric sheets prepared above in a different thickness for each of the different sheets—0.6 mil on the A sample, 1.2 mils on the B sample, and 2.2 mils on the C sample. The three resulting tapes, A–C, were then tested for various properties as follows.

To measure the resistance to moisture-penetration exhibited by an insulating sheath formed from one of the tapes of this example, the tape was applied to an approximately ten-inch long polyethylene-insulated AWG 10 copper wire over a two-inch length of the wire that had been stripped of insulation. The tape was spirally wrapped on the bare copper wire beginning on the edge of the two-inch length; the tape was half-lapped (that is, an overlying convolution covered one half of the previously wrapped convolution) and the tape was stretched to 300 percent elongation as it was wrapped. The wrapping continued 1¼ inch onto the original insulation at the other edge of the bared area, then returned across the test area and extended 1¼ inch past the original starting point on the insulated portion of the wire, then went back across the test area, and finally returned over the test area; altogether there were four half-lapped layers, or eight thicknesses of tape. Current flow through the sheath was used to determine moisture-penetration, the current flow being measured by bending the ten-inch-long test wire into a U shape (with a four- or five-inch radius), immersing the wire in 75° C. water, and applying an alternating voltage of 600 volts, 60 Hz. between the wire and the water; the current flow was measured between the conductor and water. Next, the test sample was conditioned by immersing it for 14 days in a pressure cooker where the water was heated to 116° C., after which current flow was again measured by placing the test sample in the 75° C. water with a 600-volt potential applied between the conductor and water. Before exposure in the pressure cooker, current flows of 17 microamps for the A tape, 15 microamps for the B tape, and 19 microamps for the C tape were measured between the conductor and the water. After 14 days exposure in the pressure cooker, current flows of 35 microamps for the A tape, 38 microamps for the B tape, and 25 microamps for the C tape were measured between the conductor and water. A base sheet of this example not coated by adhesive was also tested by the above test, and a current flow of about 27 microamps was measured between the conductor and water before exposure in the pressure cooker, while after exposure in the pressure cooker for only 10 days, a current flow of 260 microamps was measured.

The tapes of the example were tested for self-fusing properties by the test of Military Specification MIL–I–3825B, and they were tested for adhesion to steel at 23° C., corrosion of copper, and dielectric properties in accordance with ASTM D–1000. Tensile strength and elongation at break were measured on an Instron tensile tester, using a stretch rate of 12 inches per minute with a 0.5-inch-wide sample and using an initial separation between the jaws gripping the tape of ½ inch. The results were as follows:

| | Adhesion to steel (ounces per inch width) | Dielectric strength (volts/mil) | Copper corrosion | MIL–I–3825B fusion test | Tensile strength (p.s.i.) | Elongation at break (percent) |
|---|---|---|---|---|---|---|
| A | 31 | 1,030 | (¹) | Pass | 193 | 1,950 |
| B | 35 | 811 | do.¹ | do | 217 | 1,800 |
| C | 35 | 769 | do.¹ | do | 157 | 1,450 |

¹ Satisfactory.

Example 2

A commercial self-fusing tape sold as Bi-Seal self-bonding electrical tape No. A–2 and manufactured by Bishop Manufacturing Corporation was knife-coated with the rubber-resin adhesive of Example 1 in a thickness of 1.2 mils. It is believed that the Bi-Seal tape No. A–2 is a partially vulcanized tape that includes polyisoprene and polyisobutylene elastomers a coumarone-indene tackifier, and fillers. While the Bi-Seal A–2 tape has marginal self-fusing properties such that it generally passes the 24-hour test of MIL–I–3825B, the self-fusing properties of the tape were greatly improved by addition of the adhesive layer so that the tape passed the MIL–I–3825B test one hour after wrapping on the wire. When tested for current flow before exposure in the pressure cooker, a current flow of 18 microamps was measured; after exposure for 14 days in a pressure cooker, a current flow of 24 microamps was measured.

Example 3

A commercial self-fusing tape sold as SPT tape by General Electric Company was coated with the rubber-resin adhesive of Example 1 in a thickness of 1.2 mils. The SPT General Electric tape is believed to be a partially vulcanized tape manufactured under the teachings of U.S. Pat. 3,334,063 and to include an ethylene-propylene elastomer, a hydrocarbon resin tackifier, a rosin acid tackifier, and dicumyl peroxide curing agent as well as fillers. While the General Electric tape has only marginal self-fusing properties and often will not pass the test in MIL–I–3825B, the tape of the example including the rubber-resin adhesive does have good self-fusing properties and routinely passes the test in MIL–I–3835B. In the test for resistance to water-penetration, a current flow was measured in the test above of 16 microamps before exposure in the pressure cooker, while after 14 days of exposure in the pressure cooker, a current flow of 25 microamps was measured.

Example 4

A partially vulcanized base sheet was prepared from all the ingredients of the base sheet of Example 1 used in the amounts described there and from the following additional ingredients:

| | Parts by wt. |
|---|---|
| Quinone oxime dibenzoate | 24 |
| Red lead | 36 |
| Sulfur | 4.0 |
| Zinc oxide | 20 |

The ingredients included in the base sheet of Example 1 were milled and mixed in the manner described in Example 1. Then the additional ingredients were added and the mixture calendered through an inverted "L" calender as described in Example 1, but with the temperature of the hottest rolls reduced to 250° F. The mixture was calendered onto a Teflon liner to a thickness of 29.5 mils and the resulting sheet construction was wound into a jumbo roll. Then the jumbo roll was heated to 325° F. for 2 hours to partially vulcanize the elastomers. The sheet construction was then unwound from the jumbo roll, coated on one surface with a 5-mil thickness of the adhesive of Example 1, and then slit into tape widths.

The following properties were measured for samples of the tape:

Adhesion to steel (oz. per in. width) _____ 80
Dielectric strength (volts/mil) _____ 725
Copper corrosion _____ Satisfactory
MIL–I–3825B Fusion Test _____ Pass
Tensile strength (p.s.i.) _____ 800
Elongation at break (percent) _____ 1700

Example 5

A commercial electrically insulating tape sold by Plymouth Rubber Company as Double Rubber tape was coated with rubber-resin adhesive according to this invention. This tape which has a caliper of 45 mils is believed to include a first layer of a vulcanized elastomer and tackifier composition and a second layer about 15 mils thick of a nonvulcanized elastomer and tackifier composition. The tape exhibits creep and flow characteristics such that over a period of several months overlapping convolutions of it in an insulating sheath may fuse together. The tape was coated with about 1.2 mils of the rubber-resin adhesive used in Example 1. The following properties were measured for the resulting tape:

Adhesion to steel (oz. per in. width) _____ 64
Dielectric strength (volts/mil) _____ 619
Copper corrosion _____ Satisfactory
MIL–I–3825B Fusion Test _____ Pass
Tensile strength (p.s.i.) _____ 1160
Elongation at break (percent) _____ 1400

I claim:

1. An electrically insulating self-fusing tape from which insulating sheaths that have high resistance to moisture-penetration may be formed, and which has good self-fusing properties and immediate adhesion to insulation and metal conductor surfaces, comprising an elastomer- and tackifier-based self-fusing base sheet and, firmly united to the base sheet, a layer at least ¼ mil in thickness of a rubber-resin pressure-sensitive adhesive.

2. A tape of claim 1 in which the base sheet comprises 100 parts of elastomer, between 5 and 75 parts of resinous tackifier, up to 50 parts of a reinforcing thermoplastic resin, and up to 15 parts of curing agent for the elastomer, at least one of the thermoplastic resin and curing agents being included and the amount of thermoplastic resin when included being at least 10 parts and the amount of curing agent when included being at least 1 part.

3. A tape of claim 1 in which the base sheet comprises 100 parts of elastomer, between 25 and 75 parts of the elastomer being ethylene-propylene elastomer and the balance being isobutylene elastomer, between 10 and 50 parts of thermoplastic resin selected from polyethylene and polypropylene, and between 5 and 75 parts of resinous tackifier.

4. A tape of claim 3 in which the base sheet further includes between 10 and 50 parts of plasticizer and up to 125 parts fillers.

5. A self-fusing tape from which insulating sheaths that have high resistance to moisture penetration may be formed, and which has good self-fusing properties and immediate adhesion to insulation and metal conductor surfaces, comprising a base sheet that comprises 100 parts of elastomer, at least 15 parts of which are ethylene-propylene elastomer, between 5 and 75 parts of resinous tackifier, and up to 50 parts of thermoplastic resin selected from polyethylene and polypropylene, and up to 15 parts of curing agent for the elastomer, at least one of the thermoplastic resin and curing agents being included and the amount of thermoplastic resin when included being at least 10 parts and the amount of curing agent when included being at least 1 part, and, firmly united to the base sheet, a layer at least ¼ mil in thickness of a rubber-resin pressure-sensitive adhesive.

6. A self-fusing tape from which insulating sheaths that have high resistance to moisture-penetration may be formed and which exhibits self-fusing properties and immediate adhesion to insulation and metal conductor surfaces, comprising a base sheet that exhibits creep and flow properties such that overlapping convolutions of the tape eventually self-fuse and which comprises 100 parts of elastomer and between 5 and 75 parts of a resinous tackifier, and, firmly united to the base sheet, a layer at least about ¼ mil in thickness of a rubber-resin pressure-sensitive adhesive.

References Cited

UNITED STATES PATENTS

| | | | |
|---|---|---|---|
| 3,334,063 | 8/1967 | Berliner | 260—41 |
| 3,379,562 | 4/1968 | Freeman | 117—122 |
| 2,576,148 | 11/1951 | Schechtman | 117—122 |
| 3,129,816 | 4/1964 | Bond et al. | 206—59 |
| 3,554,940 | 1/1971 | Arakawa et al. | 117—122 P |
| 3,372,049 | 3/1968 | Schaffhausen | 117—7 |
| 3,265,769 | 8/1966 | Schaffhausen | 260—889 |

ROBERT F. BURNETT, Primary Examiner

G. W. MOXON II, Assistant Examiner

U.S. Cl. X.R.

117—122 P, 138.8 E; 156—53; 161—167